Dec. 17, 1940.  H. T. LAMBERT  2,225,563
BRAKE UNIT
Filed March 2, 1940
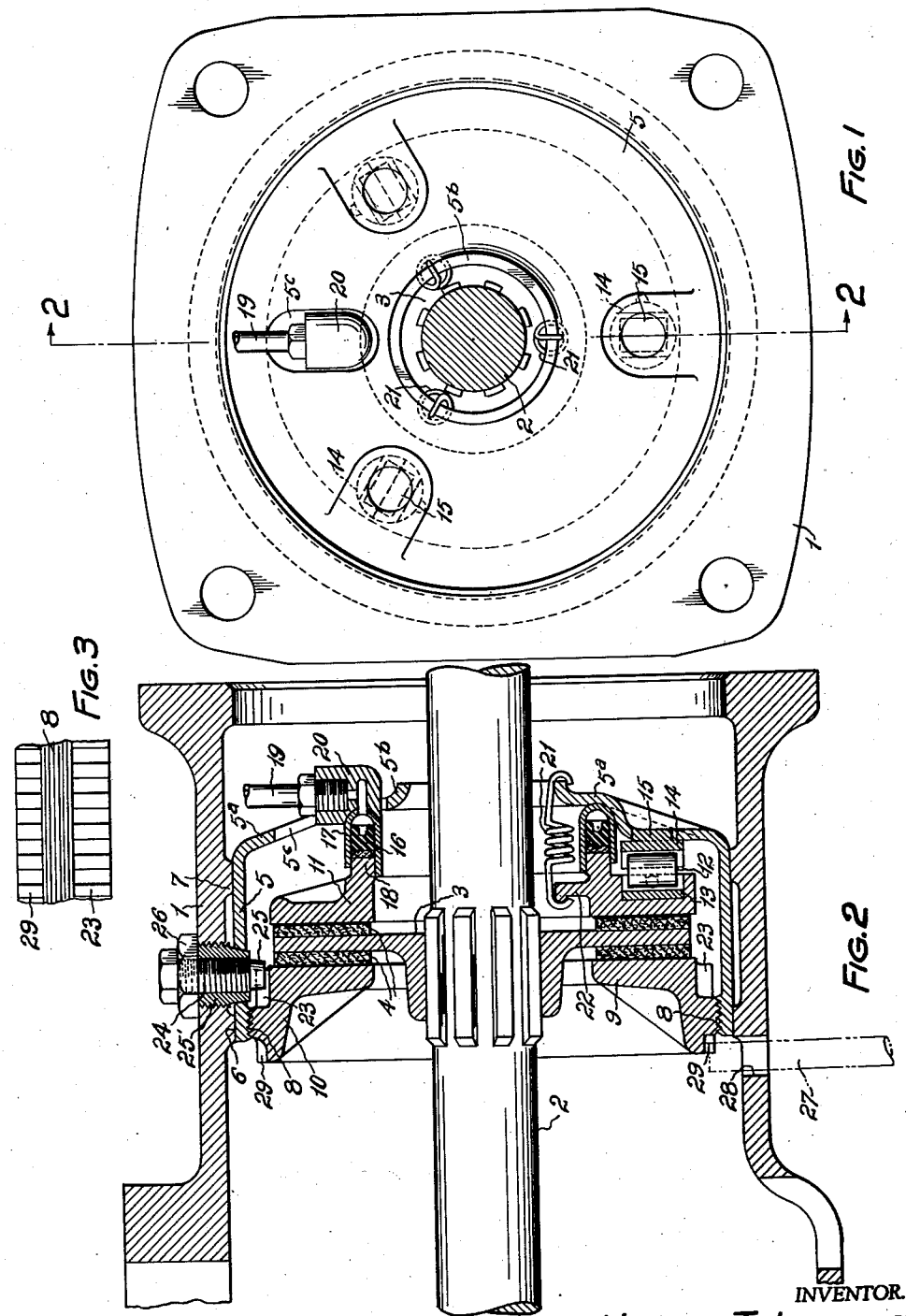
INVENTOR.
HOMER T. LAMBERT
BY
ATTORNEYS.

Patented Dec. 17, 1940

2,225,563

UNITED STATES PATENT OFFICE 2,225,563

BRAKE UNIT

Homer T. Lambert, St. Joseph, Mich.

Application March 2, 1940, Serial No. 322,024

8 Claims. (Cl. 188—72)

The object of this invention has been to produce an advantageous and simplified brake unit, and particularly mounting means therefor suitable for use in conjunction with certain types of traction or motor vehicles.

A special feature of the invention lies in novel provisions made for the ready mounting of the brake mechanism or unit itself upon the frame or equivalent supporting part of a tractor or like vehicle.

Another feature of the invention lies in the novel assemblage of the parts of the brake itself, permitting access to said parts readily, ease in removing and replacing the parts and quick adjustment of the brake means relatively to each other whereby to either adjust the action of the friction parts therebetween or to take up wear between such parts.

A further object of the invention has been to devise the brake unit in sectional construction whereby an advantageous form and arrangement of hydraulic pressure features may be availed of as will be more fully pointed out hereinafter.

Another object of the invention has been to devise certain mounting means for the brake parts lending itself particularly to the use of pressed metal construction to thereby cheapen the production cost of the unit.

The invention involves other features of construction as to details that will also be presented more fully as this description proceeds in conjunction with the accompanying drawing, in which:

Figure 1 is an end view of the brake unit looking from the outer side thereof in respect to the frame structure upon which it is mounted.

Figure 2 is a vertical sectional view taken about on the line 2—2 of Figure 1.

Figure 3 is a fragmentary detail view of the normally relatively stationary brake disc in respect to its peripheral construction.

In the accompanying drawing there is illustrated generally the frame or support 1 which may be a transmission casing or other member forming a part of the frame of a tractor or other body upon which or in conjunction with which the brake mechanism of the invention is designed to be used.

The brake unit of the invention is, generally speaking, of the brake disc type of my Patent No. 2,063,443, issued December 8, 1936, having in mind particularly the employment of certain associated brake discs whereby the braking function of the unit is obtained.

Within the support or frame member 1 is located a shaft or axle element 2 in conjunction with which the brake means is employed. This shaft may be a driven shaft required to be retarded or stopped in its rotation, or any other conventional rotating element with which brake means is desired to be employed. On the shaft 2 is splined a rotating and slidable brake disc 3, equipped on opposite surfaces thereof with friction elements 4 of any conventional kind within the purview of the invention. Conveniently disposed within the hollow portion of the frame or support 1 is a drum like shell or supporting member 5, the outer peripheral portion of which, said member being circular in form, has suitable bearing against bearing portions 6 and 7 consisting of annular projections on the inner surface of the support 1.

Adjacent to one end of the supporting member 5 the same is internally screw threaded so as to engage at such threaded portion with the externally threaded portion of an annular flange 8 provided on the normally relatively stationary brake disc 9 which carries the offstanding annular flange portion 10 on which the threads previously referred to are carried directly formed in the flange 8. At the side of the rotative brake disc 3, opposite that having the normally relatively stationary brake disc 9 adjacent thereto, is the relatively movable brake disc 11. The brake disc 11 is movable axially of the shaft 2 and is adapted for slight rotative movement in addition to its axial movement as will be more fully described hereinafter. The rotative movement is effected as a result of auxiliary operation of the disc 11 after being caused to engage initially with the adjacent friction elements 4 of the rotating disc member 3. This affords a self energizing or servo operation, which is known in the art, and for the purpose there are employed energizing rollers 12 located between the opposing inclined surfaces of a stationary insert 13 and a rotative insert 14, a pair of which inserts is provided for each roller.

The rotative insert 14 is provided with a boss or pivot extension 15 entering a bearing opening provided in the supporting member 5.

It is to be understood that a series of the rollers 12 will be availed of though only one roller and its coacting plates 13 and 14 is illustrated. The member 5 being preferably made of sheet metal, the bearing openings for the parts 15 may be stamped out of such metal in manufacturing practise.

The axial movement of the movable brake disc 11 is effected by hydraulic means including the hydraulic plunger or ring 16, disposed in the hollow portion of an annulus 17, preferably made of sheet metal and mounted on and supported by the supporting member 5 to which it is suitably and rigidly secured. A pipe or conduit 19 supplies the fluid pressure medium, oil, or the like, to a coupling member 20 that is associated with the annulus 17 in an obvious manner as apparent from the drawing.

The supporting member 5 or shell, has a portion 5a which is provided with a centrally curved flange 5b. A suitable number of springs 21 are connected each at one end with the flange 5b and at the opposite end with a lug or projection 22 on the brake disc 11, the purpose of these springs being to cooperate for the release action of the brake by pulling the disc 11 in a direction away from its cooperating discs when the pressure in the pressure chamber of the annulus 17 is relieved.

The normally relatively stationary brake disc 9 is formed on its outer periphery with large projections or teeth 23. These are adapted to be engaged by a set screw 24 at the inner tapered end 25 of the latter for locking the disc 9 against movement relative to the supporting member 5 and in a set position of adjustment. By reason of the threaded connection of the disc 9 with the supporting member 5, rotation of the disc 9 relative to the supporting member 5 will effect an axial adjustment of the disc 9 to control the proper action of the brake discs and to take up and compensate for the wear between the friction parts of the brake discs.

The set screw 24 passes through a skirt thimble 25' which thimble is tapered at its inner end also and provided with a many sided turning head 26, the inner tapered end of the thimble engaging in an opening of the supporting member 5 for holding the latter stationary in the frame or support 1.

The operation of adjusting the disc 9 is simple and accomplished by introducing a tool part shown in dotted lines 27 in Figure 2 through an opening 28 in the frame or support 1. Said tool part is adapted to engage teeth or projections 29 on the outer portion of the flange 10 of the disc 9. By leverage action of the tool part 27, after the set screw 24 has been withdrawn or unscrewed from engagement with the part 23 with which it coacts, the disc 9 may be rotated slightly to accomplish the desired adjustment for the purposes previously described.

Obviously, the brake unit of the invention is of very simple construction and the assemblage of the parts thereof admits of ready application and removal of the same to the support 1 with which the assemblage is mounted. Whenever it is required to renew the friction elements 4, this can be accomplished very easily by reason of the accessibility of other members of the unit and the removability of the latter. The brake unit generally as a whole can be removed and detached, furthermore, without difficulty. The self energizing roller feature, including the rollers 12, is of the type shown particularly in my Patent No. 2,063,445, issued December 8, 1936.

It is notable that the arrangement of the parts described and the form especially of the outer end of the supporting shell-like member 5 enables the latter to hold the annulus 17 providing the hydraulic chamber and enclosing the piston or ring 16, in place. The portion 5a of the member 5 is cut out at 5c to provide an opening for the proper arrangement of the coupling member 20.

Having thus described my invention, what I claim as new and desire to secure by Letters Patent of the United States, is:

1. In combination, a frame or support, a removable supporting member mounted therein, a brake unit for cooperation with a shaft or the like comprising a plurality of cooperative brake parts wholly mounted upon said supporting member and displaceable therewith from the frame or support, one of said parts being adjustably connected to the removable supporting member, and common means for retaining said supporting member on the frame or support and for locking the adjustable brake part in adjusted position in the supporting member.

2. A brake unit substantially as claimed in claim 1, wherein the common retaining means comprises a two-part locking means, one part arranged to interlock with the supporting member and the other to interlock with the adjustable brake part.

3. In combination, a frame or support, a removable supporting member mounted therein, instrumentalities for holding said supporting member in place on the frame or support, and a brake unit for cooperation with a shaft or the like comprising a plurality of cooperative brake parts wholly mounted upon said supporting member and displaceable therewith from the frame or support, the supporting member being screw threaded, and one of the brake parts comprising a threaded portion adjustably engaged with the screw threaded portion of said supporting member, said holding instrumentalities including a member arranged to extend through the frame or support and the supporting member into interlocking engagement with the threaded brake member.

4. In combination, a frame or support, a removable supporting member mounted therein, instrumentalities for holding said supporting member in place on the frame or support, a brake unit for cooperation with a shaft or the like comprising a plurality of cooperative brake parts wholly mounted upon said supporting member and displaceable therewith from the frame or support, and a holding part attached to the frame and adapted to engage with one of the brake parts aforesaid for maintaining the latter in a predetermined adjusted position relative to its associated brake parts.

5. In a brake unit, in combination, a frame comprising spaced portions, a brake unit mounted between said spaced portions and including a shell-like supporting member, relatively stationary and movable brake discs mounted in the supporting member, the relatively stationary brake disc having adjustable connection with the supporting member, mounting means supporting the relatively movable brake disc upon the supporting member and means for supplying motive force to the movable brake disc for effecting its braking function, together with a rotative brake disc adapted to cooperate with the stationary and movable brake discs aforesaid.

6. A brake unit as claimed in claim 5, in which the mounting means between the movable brake disc and the supporting member comprises an annulus receiving a portion of the movable brake disc and providing a piston chamber, said annulus engaged with and supported by the supporting member.

7. A brake unit as claimed in claim 5 in which the stationary brake member is provided with projections, and a removable member associated with the supporting member to engage between said projections to hold the stationary brake disc at a desired adjustment.

8. A brake unit as claimed in claim 5 in which the stationary brake member is provided with projections, a removable member associated with the supporting member to engage between said projections to hold the stationary brake disc at a desired adjustment and comprising a set screw adjustable on the frame, and an adjustable removable thimble on the frame having a portion engaging the supporting member and in which the set screw is adjustably mounted.

HOMER T. LAMBERT.